April 26, 1966   J. L. BENTON   3,247,529
FOAMED PLASTIC FIELD HOSPITAL LITTER BED
Filed Feb. 3, 1964
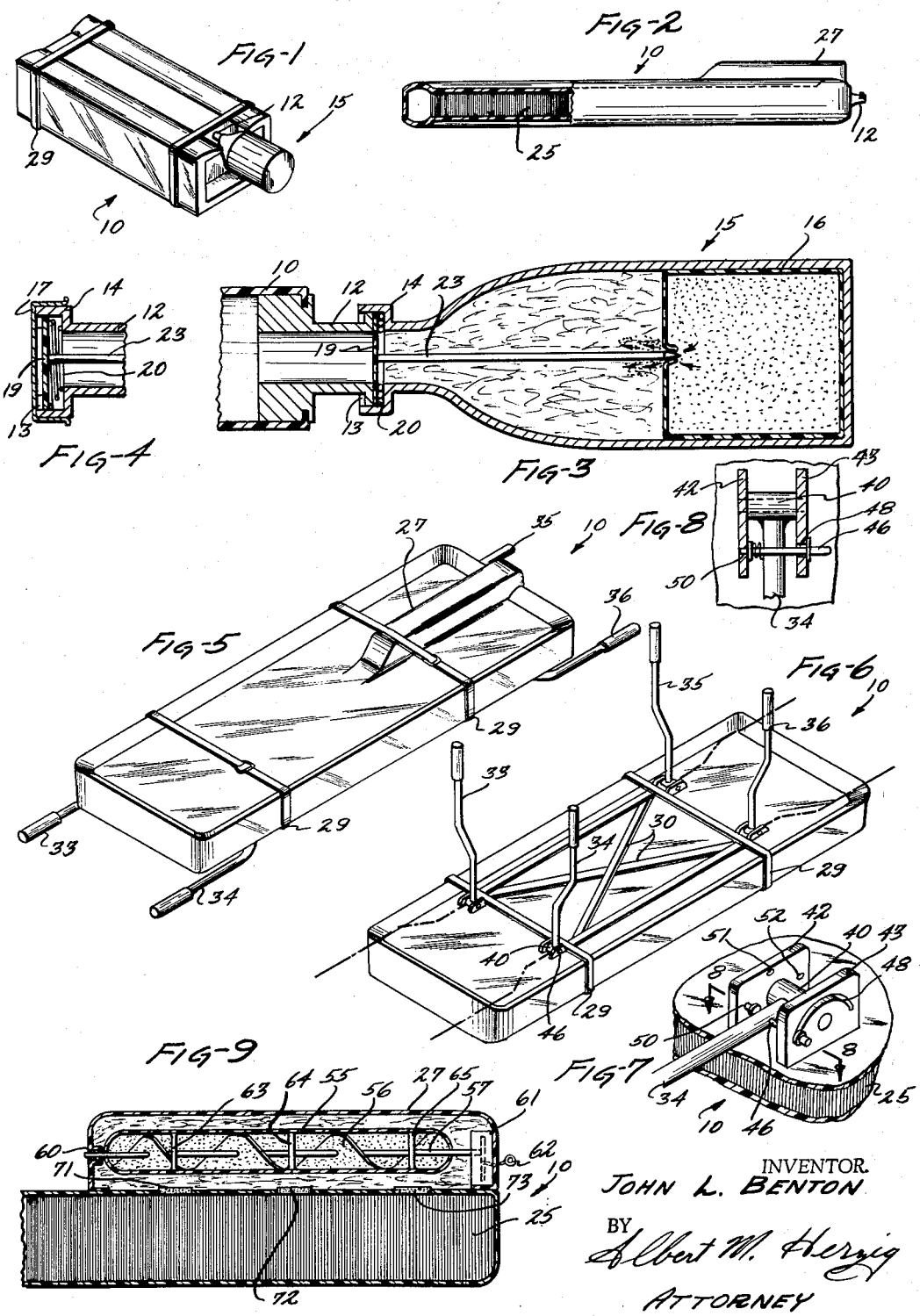
INVENTOR.
JOHN L. BENTON
BY
Albert M. Herzig
ATTORNEY

United States Patent Office 3,247,529
Patented Apr. 26, 1966

3,247,529
FOAMED PLASTIC FIELD HOSPITAL
LITTER BED
John L. Benton, Los Angeles, Calif., assignor to Denry Corporation, Los Angeles, Calif., a corporation of California
Filed Feb. 3, 1964, Ser. No. 342,134
6 Claims. (Cl. 5—82)

This invention relates to a novel article which is a light, durable device suitable for use as a hospital bed, but also suitable for use as a litter, with many significant advantages over litters as such, now in use. The invention fulfills many needs for military use, as for example, in the battlefield as a litter and as a bed in the field hospital.

In a preferred form of the invention, the litter bed is prepared from foamed-in-place, expanded foam plastic which is foamed into a plastic envelope of appropriate shape and permitted to set. An object of the invention and one which it realizes is that it possesses the advantage of being transported in a relatively small, readily storable package, and can then be expeditiously expanded to the useful form at the site of use. The litter bed in its expanded form fulfills many objectives and satisfies many needs. It is light and can be readily and conveniently stored and transported in its packaged state. It will readily adapt to any transport suitable for pole-type litters, and, in addition, can be used with many other transport modes not possible for such litters. It can be used with the carrying handles folded completely under it, thus making the size requirement for transport no greater than the size of the plastic filled envelope. This enables it to fit narrow gauge railway cars; and reduces costs of special fixtures in current military hospital trains and air transport planes. By simply folding the handles down into their vertical position, it is readily useful as a hospital bed. Provision is made for splinting leg injuries.

In a preferred form of the invention, the litter bed is manufactured, that is, expanded by foaming the plastic in place into a litter bed configuration whereby there is produced a light, buoyant, semi-rigid structure having an approximate length corresponding to that of the usual army cot or bed and having other characteristics as described hereinafter. As stated, the article or device has a shape providing for comfort and is capable of serving as stated, as a battlefield litter, and also as a bed in a field hospital obviating the need for transfer of a patient from a litter to a bed. The advantages of the invention as stated may be realized and even amplified in the usage of the device in aircraft or on board ship, or the like.

With respect to military medical operations, the necessarily most portable of all medical units, the forward aid station is greatly handicapped by the problems arising from the use of conventional litters. Not only are they bulky and heavy, but they must be frequently exchanged as their patient cargo passes from one stage to the next in the chain of evacuation. This is awkward and inappropriate in newer concepts of modern army organization. The litter bed of this invention provides for an advanced technique in the evacuation of battle casualties, complementing the modern, advanced techniques in the tactics and strategy of modern warfare.

A forward aid station itself, in accordance with newer military concepts, is a cumbersome unit, from a mobile standpoint. This lack of mobility of the forward aid stations is due to a large extent to the difficulties in storing and transporting the pole-type litters presently used in the station. The litter bed of the herein invention makes it possible for the entire forward aid station to be transported in a small-sized truck. The non-expanded litter beds, i.e., in their packaged state, because of their small cubic volume, can be readily stored in any convenient manner. When the need for their use arises, they can expeditiously be expanded by their unique foaming-in-place technique, and may then serve not only as litters but also as beds anywhere in the chain of evacuation of casualties.

The compact storage and light weight characteristics of the invention possess important advantages for use in the medical support of air-borne military operations. Further, the litter bed is light and buoyant, i.e., it may have a flotation characteristic of as much as 200 pounds and is therefore useful in that casualties and supplies may be floated across streams and rivers.

Having reference to the preferred form of the invention mentioned above, the shape of the envelope is selected to provide the desired configuration for the structure when expanded. The envelope may be formed with a material such as Mylar, or a permeable material such as nylon cloth. It is most essential that the envelope exhibit the desired characteristics of high tensile strength for the dimensions. The envelope referred to herein, in the practice of the invention before the plastic is foamed in place, is neatly folded into a compact package. A foamed plastic material is provided in liquid resin form, together with a suitable catalyst or polymerizer (liquid or gaseous). These components are housed in a single container. The plastic resin in the container mixes with the catalyst and foams into the envelope. This foaming of the plastic serves to unfold the envelope and to completely fill it and extend it to its desired shape. Means of accomplishing shape control are provided with the envelope, as described in detail hereinafter, to establish the desired shape.

The result of the action described in the foregoing is the provision of a light, durable, comfortable, semi-rigid structure which is particularly suited for use as a litter. The resulting litter may be readily converted into a hospital bed by simply folding the carrying handles into the vertical position. They are so hinged as to lock into this position. They may be formed of, for example, cast nylon, and manufactured as an integral part of the nylon support harness as described in detail hereinafter.

In a preferred form of the invention, the litter bed is provided with a longitudinal intermediate rib or septum near the distal end so as to occupy a position between the patient's legs, and to be capable therefore of serving as a splint for broken legs where the patient is strapped in place on the bed. Separate articles therefore are not ordinarily necessary for splinting leg injuries. Further, in a preferred form of the invention, the rib or septum is formed to provide within it containers for the foamed plastic and catalyst in a cannister or cannisters. Preferably, an intermediate membrane is provided in the septum to provide chambers for the plastic and catalyst so that when the plastic is to be foamed into place, the membranes may be ruptured between the compartments and between the septum and the envelope so that the foaming in place of the plastic takes place directly from the septum. Suitable mechanical or other means may be provided internally for the rupturing of the membrane and, if necessary, for agitating the plastic and catalyst.

It is, accordingly, a primary object of the invention to provide an unique and novel device in the form of a litter capable of being manufactured, i.e., foamed in place as described, which is reliable, inexpensive, disposable, light, and durable, and yet which is extremely comfortable and additionally capable of being used as a hospital bed.

Specific objects reside in the realization of the characterization that the device can be manufactured at the site of use, and that prior to manufacture, the components can be packaged very compactly and stored in a minimum of space.

Another object of the invention is to provide a litter bed structure as described which possesses buoyant characteristics so that it is capable of serving to float casualties or supplies over streams and the like. Sufficient beam structural rigidity is, however, inherent in the design with cubic volume or displacement far less than that necessary to provide useful flotation.

A further object of the invention is to provide a litter bed as described which is capable of operation in a wide range of ambient temperatures and humidity and which is resistant to fungus, oils, explosions, and the like, and which is otherwise capable of meeting all military requirements that may be demanded of it.

A further object of the invention is to provide a litter bed structure as described which is sturdy, rugged, easy to clean, and easy to use.

Further objects of the invention will become apparent from the following detailed description and annexed drawings wherein:

FIG. 1 is a view of the plastic envelope component of a litter bed structure of the invention herein, the envelope being illustrated in an unexpanded, folded condition, and showing the container for the resin-catalyst system;

FIG. 2 is a view partly in section of the envelope in the shape it has when expanded.

FIG. 3 is an enlarged sectional view of the container of FIG. 1 as attached to a fitting in the envelope;

FIG. 4 is a detail view of the end of the resin-catalyst container;

FIG. 5 is a top perspective view of a preferred form of expanded structure incorporating the concepts of the present invention;

FIG. 6 is a bottom perspective view of the structure of FIG. 5 showing the adjustable carrying and leg structure;

FIG. 7 is a detail view of one of the three-position leg joints;

FIG. 8 is a detail view taken along line 8—8 of FIG. 7; and

FIG. 9 is a sectional view of a modified form of the invention.

The litter bed structure of the invention consists essentially of a volume of foamed plastic within a plastic envelope or envelope of other material. Foamed plastic such as polystyrene, for example, is light and cheap. It may be transported in a relatively small volume in liquid form, and upon the application of or exposure to a suitable catalyst or polymerizer it foams into a relatively large volume and sets. The foamed plastic has a mechanical strength which exists primarily in evenly-applied compression. The plastic envelope is used in the combination of the invention to develop strength in the foamed plastic; and the resulting structure exhibits desired characteristics of over-all strength and ruggedness.

The envelope, after foaming of the plastic, is preferably shaped so that the resulting rigid structure provides a comfortable support for the head, neck, torso and limbs of the patient. In the form of the invention shown in FIGS. 1 to 8, it comprises a plastic envelope 10 preferably formed of non-expandable tear-resistant material, which may be Mylar or other suitable materials appropriate for the purpose such as nylon of suitable weight.

The characteristics of the materials used for the envelope include strength, ease of repair, non-toxicity to humans, and ease of fabrication and utilization. The plastic foams into the interior of the envelope, unfolding it and completely filling it with some slight excess. The envelope may be fabricated of, for example, 10-ounce nylon over 1-ounce fiberglass matting. Other foaming plastics may be used. Isocyanate and di-isocyanate compounded urethane foams possess certain characteristics that make their use for the litter bed almost ideal. Urethane foams of the rigid type are readily adapted to a sandwich construction beam in which the outer fiber-stressed flange is provided by a light weight, high tensile sheet, and the separating web provides adequate compressive strength to maintain the flange spacing. Further advantages of these foams are found in their light weight, low thermal conductivity, non-toxicity, and resistance to deterioration. Use of a semi-rigid foam formulation permits the litter to be folded even in the expanded state.

The resin-catalyst system may be a two-component system in which a cyanate compound, i.e., the catalyst, is added to a urethane compound, i.e., the resin, and the two mechanically blended to initiate the reaction as described hereinafter. The exotherm of the reaction serves to boil off a gas, commonly Freon, that has been blown into one or both of the components under pressure and so broken that at normal temperatures (below 70° F.) it does not escape. The boiling off of the entrapped gas forms pockets of tiny bubbles in the mixture that serve to make the mixture a foaming mass. Since the mixture is very tenacious yet flexible, minute cavities of uniform size and shape are formed. Upon hardening, the sealed cavities containing the foaming gas become rigid pockets. A lamination of fiberglass may be included within the envelope making it sufficiently impervious to prevent the escape of Freon gas which would otherwise be undersirable, particularly if the device is foamed in an enclosed area, and increases structural strength.

As shown in FIG. 1, when the plastic envelope 10 is not expanded, i.e., the plastic has not been foamed into place, it may be neatly and compactly folded into a small package. As described, the envelope is formed into the litter bed structure by introducing the foamed plastic into the interior thereof. For this purpose and as shown in FIG. 3, the envelope 10 may be equipped with a neck portion or fitting 12 made, for example, of metal or plastic. The neck portion 12 has an appropriately slotted end flange 13 to form a quick connect-disconnect bayonet joint with a receptacle 14 at the end of the neck of the bottle or container 15 for the resin-catalyst system. The container 15 may be made of metal or plastic and has an interior compartment formed by a bag or housing 16 for one of the components of the foaming plastic system. The polystyrene may, for example, be contained in the container 15 in a solution form and a suitable catalyst such as peroxide may also be housed in the container or bag 16 for polymerizing the resin. The receptacle 14 at the end of bottle 15 may be closed by way of a removable cap 17.

FIG. 3 shows a piercing or puncturing means comprising disc 19 included in the receptacle 14 and normally urged outwardly by spring 20. Disc 19 carries needle point stem 23. When the quick-connect joint is made between neck or fitting 12 and receptacle 14 and the bottle 15 is pushed toward flange 13, needle point stem 23 pierces the bag or cartridge 16. This permits the plastic in the bottle 15 to mix with the catalyst in the bag or cartridge 16 so that the plastic mix foams into the interior of the envelope 10. The foaming of the plastic into the interior of the envelope 10 causes the envelope to unfold and to be completely filled with the foamed plastic material with some slight excess, the envelope assuming a desired shape as shown in FIGS. 2, 5 and 6. The resulting assembly is a rigid, comfortable, light, buoyant structure which is suitable for its intended purpose.

In order to maintain the envelope 10 is a slab shape when inflated, a system of internal shape control, comprising stitching or threads, as designated at 25, is provided in the envelope between the top and bottom surfaces. The purpose of this device is to hold the top and bottom surfaces flat and parallel to each other. The stitching 16 determines the final shape of the envelope, and may be designed so that the over-all shape is flat, curved, or contoured to the shape of the body.

The foamed-in-place structure is shown in FIGS. 2, 5 and 6. As shown, the envelope 10 is held by the stitching 25 so that the over-all shape is flat so as to be able to perform its intended purpose.

At the distal end the envelope 10 may have a rib or septum 27 which occupies a position between the patient's legs, and serves as splinting in combination with hold-down straps, as will be described. The envelope may be, of course, made without rib 27.

A harness omprising straps 29 is provided, which straps may be attached at the sides of the structure. The straps 29 function as a safety harness, that is, as a hold-down means for the patient. The straps may be formed of nylon or other suitable material. Reinforcing tapes 30 may be provided on the under side of the structure as shown in FIG. 7.

The structure also provides facilities for two-man carrying teams, as well as four-man teams. Carrying handles in the form of pole-like extensions 33, 34, 35, and 36 are provided. Each of these handles is provided with a three-position locking joint. They can be folded straight out for carrying; they can be set in the vertical position to provide legs for support of the litter as a bed. They can also fold back under the litter bed with the desirable result of shortening the over-all length to that of the expanded plastic filled envelope. The handle-leg structures will be an integral part of the support harness of the litter bed.

FIGS. 7 and 8 show details of one of the three-position locking joints (i.e.), for leg 34. The leg is attached to a hub 40 pivoted between legs 42 and 43 of a yoke attached to the support harness or to the bottom of the litter bed. Attachment of hub 40 is preferably by way of a removable pin. Pin 46 extends transversely through leg 34. It moves in arcuate slot 48 in leg 43 and is engageable in any of three holes 50, 51, and 52 in leg 42, providing a positive three-position locking detent.

Whenever the litter is brought into the center, it is merely necessary to erect it on legs 33, 34, 35, and 36. As may be observed, therefore, the invention provides an improved assembly which before foaming in place is composed of components occupying a minimum of space. The device is capable of being manufactured or erected by foaming in place of the plastic into a rigid, light, comfortable, and buoyant structure and as such serves as either a litter or a bed, as described above. It will be observed by those skilled in the art that it achieves and realizes all of the objects and advantages as outlined in the foregoing, as well as having many additional advantages which are apparent from the detailed description.

FIG. 9 shows a modified form of the invention in which the resin-catalyst system is in compartments located within the splint septum 27. The septum 27 of FIGURE 9 is like that of FIGURE 5. The litter bed of FIGURE 9 may otherwise be like that of FIGURES 5, 6 and 7. The septum 27 of FIGURE 5 might have in it the activating means for the foaming plastic as shown in FIGURE 9. The impeller method of foam activation is preferred. As shown in FIG. 9, the resin-catalyst system is placed within the splint septum, the means of activation also being included therein. In this form of the invention, one of the components of the resin-catalyst system is in a flexible bag 55 within the septum. The other component is on the outside of the bag. Upon activation, the bag is ruptured to start the reaction and the envelope is ruptured to allow the reactive agents to foam into the envelope.

In the form shown, an activating unit is provided which is in the form of a mechanical helical impeller unit 56 having a shaft 57 journalled in a fitting 60. The system is activated by way of shaft 57. The shaft may be rotated in any of various ways, preferably by means of a spring motor 61 which is wound by rotating a spool, preferably by a pull cord 62 with the shaft being rotated in the opposite direction by the unwinding of the spring. The impeller 56 itself ruptures the bag 55 and rupture discs or vanes 63, 64, and 65 within the bag. The impeller drive means (i.e.), the motor itself, is preferably within rib 27. Other appropriate mixing techniques may be used, including those activated by gas, chemical, and irradiation.

Rupture discs 71, 72, and 73 are provided in envelope 10 which are ruptured by pressure of the foamed plastic agitated by impeller 56 so that it foams into the envelope.

In another alternative embodiment of the invention, the cannister for the resin-catalyst system may be at one end of the litter bed, otherwise functioning in the same way, or on the other hand, separate cannisters may be provided at the opposite ends of the litter bed.

The foregoing disclosure is representative of preferred embodiments of the invention and is to be interpreted in an illustrative rather than a limiting sense, the invention to be accorded the full scope of the claims appended hereto.

It is claimed:

1. An expandable structure adapted to be expanded on site by foaming plastic material, comprising; an envelope formed of flexible sheet material folded into a compact package, foaming plastic means comprising a resin and catalyst and means holding them separate from each other, means to bring the resin and catalyst together to foam the plastic, means for directing the foamed plastic into the envelope to expand it whereby upon setting up of the material a relatively rigid structure is formed, said envelope having the configuration of a litter bed and including, when expanded, an intermediate upstanding rib of said flexibile sheet material at the distal end of the litter bed in a position to lie between the legs of a patient on the bed and serve as a splint member, said rib having container means therein refining compartments for holding said resin and said catalyst separate from each other and including flexible means, and manually actuable means for rupturing said flexible means whereby to bring the resin and catalyst into contact with each other and to allow the foamed plastic to foam directly into the envelope.

2. A structure as in claim 1 wherein the said compartments in the rig are provided by a rupturable flexible bag within the rib.

3. A structure as a claim 1 wherein the said compartments in the rib are formed by a flexible rupturable bag within the said rib with one of the components of the foamed plastic system in the bag and the other on the outside of it, and rupturable means between the rib and the envelope.

4. A structure as in claim 1 including activating means for the foamed plastic system comprising a mechanical device manually actuatable from the exterior thereof for bringing the resin and catalyst into communication with each other and with the interior of the envelope and for blending the said elements by agitation thereof.

5. A structure as in claim 3 including a mechanical device manually actuable from the exterior of the envelope for rupturing said bag to bring the resin and catalyst into communication and causing the plastic to foam into the interior of the envelope.

6. A structure as in claim 5 wherein said mechanical device includes an helical impeller within the bag for rupturing the bag and agitating the mixture.

(References on following page)

References Cited by the Examiner

UNITED STATES PATENTS

| | | | |
|---|---|---|---|
| 2,394,245 | 2/1946 | Koller | 5—82 |
| 2,512,931 | 6/1950 | Glover | 5—82 |
| 2,657,716 | 11/1953 | Ford | 5—350 |
| 2,823,393 | 2/1958 | Baldine | 5—344 |
| 2,992,194 | 7/1961 | Paulsen | 260—2.5 |
| 2,997,100 | 8/1961 | Morris | 5—348 |
| 3,059,253 | 10/1962 | Sager | 264—54 X |
| 3,110,552 | 11/1963 | Voelker | 264—45 |

FOREIGN PATENTS 231,363 7/1944 Switzerland.

FRANK B. SHERRY, *Primary Examiner.*

R. D. KRAUS, *Assistant Examiner.*